3,558,546
ADHESIVE CEMENT
Joe R. Winney, Stow, and Leon F. Fiedler, Cuyahoga Falls, Ohio, assignors to the B. F. Goodrich Company, New York, N.Y., a corporation of New York
No Drawing. Continuation-in-part of application Ser. No. 416,112, Dec. 4, 1964. This application Oct. 9, 1967, Ser. No. 674,010
Int. Cl. C08g 51/26, 51/34
U.S. Cl. 260—30.4         2 Claims

ABSTRACT OF THE DISCLOSURE

An adhesive cement comprising (a) a bonding phase consisting essentially of a novolak resin component and a rubber polymer component which may be a butadiene-acrylonitrile copolymer with from 10 to 50 percent by weight bound acrylonitrile, a linear polyesterurethane or a polyacrylate and (b) a solvent phase for dissolving the bonding phase which is comprised essentially of solvents other than ketones and nitro solvents. The bonding phase contains from 40 to 200 parts by weight of the novolak resin per 100 parts by weight of rubber polymer. The cement contains from 5 to 50 percent by weight of solvent.

---

This is a continuation-in-part application of our application Ser. No. 416,112, filed Dec. 4, 1964, now abandoned.

This invention relates to novolak resin-rubber polymer adhesive cements and pertains more particularly to a class of such cements which exhibits exceptional stability upon aging and which provides unexpectedly superior bonds when adhering non-porous surfaces together.

In recent years adhesives have been employed extensively in applications where previously only mechanical bonding was felt to be suitable. Brake linings used in braking assemblies for automobiles, trucks and airplanes now generally are bonded structurally to the brake shoes by an adhesive rather than by rivets and airplane panels have been "welded" together with adhesive rather than by rivets. Adhesives which have proven particularly suitable for these purposes are the novolak resin-rubber polymer adhesives described in U.S. Pat. 1,931,309. These adhesives have been employed for structural bonding purposes extensively both in the form of a "dry" tape and in the form of an adhesive cement, although use of the adhesive cement has become more preferred by fabricators because of its ease of application as compared to the adhesive tape.

In the formulation of the novolak resin-rubber polymer adhesive cements, ketones have been used almost without exception either as the sole solvent or as the principal solvent component of the cement. The two primary reasons why the ketones, and in particular methyl ethyl ketone, have been used are (1) because the ketones are excellent solvents for both the novolak resin and rubber polymer components of the cement and (2) because ketones are relatively inexpensive compared to most other solvents which might be suitable.

However, it recently was discovered that certain solvents (including the ketones) used for dissolving the novolak resin and rubber polymer components of the cement cause a change to occur in the adhesive cement upon storage which deleteriously affects the ability of the cement to form the exceptionally high bond strengths developed when the cement is used soon after its preparation. The degradation effect resulting from storage of the cement is not observed in the "dry" novolak resin-rubber polymer adhesive tapes. Also, when using the aged cements in which a ketone is the sole or principal solvent component for bonding together dense non-porous structures pockets of vapor normally are formed at the bond line when the assembly is heated to temperatures sufficient to "cure" the adhesive in order to develop optimum bond strength. The vapor pockets occur even though the adhesive after being applied to one of the surfaces to be bonded together is heated to drive off the ketone in the cement. The formation of the vapor pockets at the bond line when adhering non-porous structures together obviously had adverse effect upon the bond strength developed. However, the decrease in bond strength observed when using aged cement for adhering non-porous structures together can not be attributed solely to the formation of the vapor pockets at the bond line, since vapor pockets do not occur when one or both of the structures to be bonded together are porous, but yet the bond strength is decreased.

The same adverse effects as are observed when ketones are used as the sole or principal solvent of the cement also are observed when other solvent systems which have been used commercially for such cements were evaluated.

It is believed that when the ketones and other deleterious solvent systems which have been used commercially for formulating the cements are employed the solvent slowly becomes associated with the bonding phase (the uncured novolak resin-rubber polymer component) of the adhesive cement. Although the exact nature of the attachment of the solvent to the bonding phase of the adhesive is not completely understood, it is theorized that bonding occurs between the active groups of the solvent and some sites on the uncured novolak resin-rubber polymer phase of the adhesive. The proposed theory would explain the aforementioned observed reduction in bond strength capabilities of aged cements since the assumed reaction would reduce the number of chemical reactive sites available for cross-linking and would thereby result in a depressed cure rate. The bond between the solvent and the novolak resin-rubber polymer phase of the adhesive apparently is weak and is broken when the adhesive is heated for a period of time at the cure temperature liberating the solvent from its association with the bonding phase. At the temperature of cure (usually between 350°–450° F.) the liberated solvent would vaporize and cause the formation of the vapor pockets which have been observed when non-porous structural bodies are being united. If one or both of the structural bodies to be united are porous, the solvent vapor can escape into the porous body thereby eliminating the presence of vapor pockets at the bond line. The above theory, therefore, is consistent with the observed conditions present in the bonded structures. The deteriorating effects discussed above apparently are unique with cements in which a novolak resin is employed as the phenolic component of the adhesive, since use of other phenolic resins in place of the novolak resin does not produce the degradation upon aging that is observed when novolak resins are used.

Ketone (for example, methyl ethyl ketone, acetone and methyl isobutyl ketone) and nitro solvents (for example, nitromethane, nitroethane and 2-nitropropane) are particularly harmful in producing degradation effects in novolak resin-rubber polymer cements upon aging.

It now has been found that the use of certain solvent systems in the formulation of certain novolak resin-rubber polymer adhesive cements do not cause the objectionable harmful effects upon aging of the cement that are observed in cements where solvents such as the ketones or nitro solvents are used.

The adhesive cements of this invention are particularly useful for bonding brake linings to brake shoes. Brake linings that are used commonly today are of two basic types, namely, the lining referred to as "organic type brake lining" and lining known as "metallic brake lining." The organic type lining is generally used and typically comprises a mixture of asbestos, cashew net shell oil as a friction modifier, a phenolic resin binder, rubber scraps as a filler material and metallic chips of brass or powdered lead or aluminum. Metallic brake linings are made from finely powdered iron or copper, graphite and lesser amounts of inorganic fillers and friction modifiers, the components being compacted and bonded together under high pressure and temperature. The adhesive cements of the present invention perform equally as well with either type of brake lining.

The adhesive cements of the invention also are useful in attaching shoe soles to shoe uppers in manufacutring footwear and for bonding the following materials to themselves or to each other: cork, cardboard, leatherboard, fiberboard, paper and other porous materials, wood, Masonite, nitrile rubber, polyvinyl chloride polymers and copolymers, nitrocellulose, cellulose acetate, urea and phenol aldehyde resins, nylon, polyvinyl alcohol, iron, brass, aluminum, tin, chromeplate and glass.

The present discovery, as was indicated above, is germane only to those cements in which the phenolic resin component is a novolak resin. Phenolic resins are well known resinous materials produced by the reaction of a phenol with an aldehyde. They are classified as belonging to one of two distinct sub-classes. These sub-classes are (1) the one-step type of phenolics commonly referred to as "resoles" and (2) the two-step type commonly referred to as "novolaks." Resole type phenolic resins are produced by reacting together one mole or more of formaldehyde with one mole of phenol under alkaline conditions. The reaction product is thermosetting and unstable. Refrigeration of the reaction product normally is required to prevent premature curing of the resin. The reaction product is cured by the application of heat, acidic catalysts frequently being employed to accelerate curing of the resin. Novolak type phenolic resins are produced by reacting less than one mole of formaldehyde with one mole of phenol under acidic conditions. The reaction product in this case is a stable, thermoplastic material which can be cured to a thermoset state upon the addition of a methylol group donor such as hexamethylene tetramine or formaldehyde. A more detailed discussion of phenolic resins and in particular novolak resin, is found in the book entitled "Phenolic Resins" by David F. Gould, Reinhold Publishing Corporation, New York.

Among the phenols which may be used in the preparation of the novolak resin are the monohydric phenols such as phenylhydroxide ($C_6H_5OH$) which commonly is called merely "phenol," alkyl phenols and alkenyl phenols; dihydric phenols such as resorcinol; trihydric phenols such as 1,2,4,6, trimethyl phenol; the so-called complex phenols such as cashew nut shell oil; and polyphenols such as 2,2'-bis(hydroxyphenol)-propane or bisphenol-4. The preferred phenols for use in this invention are phenol ($C_6H_5OH$), the cresols, the exylenols and the complex phenols such as cashew nutshell oil.

Among the aldehydes which commonly are used in the preparation of novolak resins are formaldehyde, paraformaldehyde and furfural. The preferred aldehyde is formaldehyde.

Many of the commercially available novolak type phenolic resins are not necessarily made from a single phenol or a single aldehyde, but are made from mixtures of phenols of mixtures of aldehydes or mixtures of both components.

The rubber polymer component of the cements of this invention include the nitrile rubbers prepared by conventional polymerization techniques from butadiene and acrylonitrile to form a copolymer of butadiene and acrylonitrile which contains from 10 to 50 percent bound acrylonitrile. The preferred nitrile rubbers are those which contain from about 30 to 45 percent bound acrylonitrile.

Small amounts of other comonomers may be polymerized with the butadiene and crylonitrile monomers provided that they do not change the essential characteristics of the polymer. Such other monomers include, for example, acrylic acid.

The rubber polymer component of the bonding phase of the adhesive cements of this invention, however, is not restricted to nitrile rubbers although they are preferred. Excellent results also are obtained when polyacrylate polymers and certain polyesterurethane polymers are used as the rubber component of the adhesive.

The polyacrylate polymer may be a homopolymer of an acrylic ester having the structure

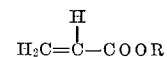

wherein R is an alkyl group having from 1 to 18 carbon atoms, or a copolymer of the above acrylic ester monomers with such comonomers as the methacrylates such as methyl methacrylate, ethyl methacrylate, butyl methacrylate and the like, vinyl ethers such as 2-chloroethyl vinyl ether, vinyl esters such as vinyl acetate, vinyl aromatics such as styrene, vinyl halides such as vinyl chloride and vinylidene chloride, dienes such as butadiene, and other monomers such as vinyl pyridine and acrylonitrile.

The polyesterurethanes that are useful as the elastomer component of the bonding phase of the adhesive cement of this application are the linear polyesterurethanes described in U.S. Pat. 2,871,218 and pending U.S. application, Ser. No. 294,933 of Robert M. Carvey and Edmond G. Kolycheck, filed July 15, 1963, and now abandoned, wherein the polyesterurethane elastomers are described as being substantially free of crosslinked structures and substantially soluble in such solvents as cyclohexanone, tetramethyl urea and dimethyl formamide. An elastomer of the type therein described comprises the reaction product obtained by heating a mixture comprising as essential ingredients: (A) 1.0 mol of an essentially linear, hydroxyl terminated polyester of a saturated aliphatic glycol having from 2 to 10 carbon atoms and the hydroxyl groups on the terminal carbon atoms and an aliphatic dicarboxylic acid containing from 4 to 10 carbon atoms, or the anhydride of the dicarboxylic acid, said polyester having a molecular weight being between 600 and 1,200 and an acid number less than 10, (B) from about 1.1 to 3.1 mols of a diphenyl diisocyanate having an isocyanate group on each phenyl nucleus, and (C) from about 0.1 to 2.1 mols of a saturated, aliphatic, free glycol containing from 2 to 10 carbon atoms and having hydroxyl groups on its terminal carbon atoms, the molar amount of the polyester and the free glycol combined being essentially equivalent to the molar amount of the diphenyl diisocyanate so that there are essentially no unreacted isocyanate or hydroxyl groups in the polyesterurethane product. The glycol serves as a chain extending constituent in the polymeric structure of the urethane elastomer. The above described polyesterurethanes, are thermoplastic, extrudable, moldable, abrasion resistant, tough elastomers. The term "linear polyesterurethane" is herein used to designate the polyesterurethanes described in U.S. Pat. No. 2,871,218 and pending U.S. application, Ser. No. 294,933, of Robert M. Carvey and Edmond G. Kolycheck, filed July 15, 1963.

The cement contains from 40 to 200 parts by weight of the novolak resin per 100 parts by weight of rubber polymer.

The term "solvent" as herein used means any liquid, or combination of liquids within which either the novolak resin component or the rubber polymer component may be dissolved, dispersed, suspended or otherwise carried in a stable state.

In some cases a common solvent is employed as the solvent for both the novolak resin component and the rubber polymer component of the adhesive. For example, when a nitrile rubber and novolak resin are used as the adhesive component, tetrahydrofuran can be used as a common solvent for both of the components. However, the general case is that two solvents in the form of a mixture must be employed to form the adhesive cement, one solvent for the novolak resin component and a different solvent for the rubber polymer component.

Preferred solvents for dissolving the nitrile rubbers are (A) aromatic hydrocarbons such as benzene, toluene, xylene, ethyl benzene, styrene and tetrahydronaphthalene, (B) halogenated aliphatic hydrocarbons such as chloroform, ethylene chloride, isopropyl bromide and isopropyl chloride, (C) halogenated aromatic hydrocarbons such as chlorobenzene, bromobenzene, chlorotoluene and o-chloronaphthalene, (D) organic esters such as ethyl acetate, isopropyl acetate, butyl acetate and methyl methacrylate and (E) heterocyclic solvents such as furan, tetrahydrofuran, thiophene, pyridine and pyrrole. The chlorinated aromatics such as chlorobenzene, chlorotoluene, o-chloronaphthalene are particularly suitable for dissolving the nitrile rubber component of the adhesive.

Preferred solvents for dissolving the polyacrylate polymers are (A) aromatic hydrocarbons such as benzene, toluene, the xylenes, p-cymene, ethyl benzene, styrene and tetrahydro naphthalene, (B) halogenated aliphatic hydrocarbons such as chloroform, carbon tetrachloride, ethylene chloride, isopropyl bromide and isopropyl chloride, (C) halogenated aromatic hydrocarbons such as chlorobenzene, bromobenzene, chlorotoluenes and o-chloronaphthalene, (D) ethers such as diethyl ether and phenyl ethyl ether, (E) organic esters such as methyl formate, ethyl acetate and butyl acetate, (F) heterocyclic solvents such as furan, tetrahydrofuran, thiophene, pyridine and pyrrole. Halogenated aromatic hydrocarbons such as chlorobenzene, bromobenzene, the chlorotoluenes and o-chloronaphthalene, are particularly suitable solvents for dissolving polyacrylate polymers.

Preferred solvents for dissolving the linear polyester-urethanes are tetrahydrofuran and dimethyl formamide.

The solvents for dissolving the novolak resin component of the adhesive are (A) alcohols having from 1 to 6 carbon atoms such as methanol, ethanol, n-propanol, isopropanol, the butanols and the like, and (B) the heterocyclic solvents such as furan, tetrahydrofuran and the like. Preferred solvents for the novolak resin component are the alcohols having from 1 to 4 carbon atoms such as methanol, ethanol, isopropanol, n-propanol and the butanols.

When a different solvent is used for the rubber polymer component of the adhesive than is used for the novolak resin component, the solvent for the rubber polymer may constitute from 30 to 85 percent by volume of the total volume of solvent used in the adhesive and the solvent for the novolak resin component may constitute from 15 to 70 percent by volume of the total volume of solvent used.

Heretofore, it was stated that the ketones and nitro solvents are particularly harmful in producing degradation in the novolak resin-rubber polymer cements upon aging and that the solvents described for use in the present invention do not cause these objectionable harmful effects upon aging of the cements. Although the use of the solvents germane to this invention will result in an adhesive cement of vastly superior properties than those obtained from use of the harmful ketone or nitro solvents, it should be realized that a solvent phase for the bonding phase of the adhesive cement which is comprised essentially of the solvents advocated for use in this invention with lesser amounts of the harmful ketone or nitro solvents will have properties that are superior to those obtained when the ketone or nitro solvents are used alone. When employed herein, the language "a solvent phase which is comprised essentially of" when related to the solvent system is intended to mean a solvent phase which contains about 75 percent or more by volume of the solvents advocated for use in this invention and about 25 percent or less by volume of the ketone or nitro solvents.

The adhesive cement contains from 5 to 50 percent by weight of solvent.

The invention is illustrated by the following examples:

EXAMPLE I

A masterbatch was prepared by mixing on a rubber mill the following ingredients:

| | Parts by weight |
|---|---|
| Butadiene-acrylonitrile copolymer (43% bond VCN) | 100 |
| Mercaptobenzothiazol | 1 |
| Novolak resin a | 50 |
| Novolak resin b | 100 |
| Phenyl beta-naphthylamine | 1 |
| Sulfur | 1 |
| | 253 | a A two-stage phenol-formaldehyde resin that is modified with cashew nut shell oil. About 8% hexamethylene tetramine is present as a hardening agent. The resin has a melting point of 75° C. and a specific gravity of 1.25.

b A two-stage phenol-formaldehyde resin that is, flow-resistant, fast setting and has a minimum initial melting point of about 190–198° F. About 9.0 percent by weight hexamethylene tetramine is used with the resin as a curing agent.

Adhesive cements were prepared by dissolving a 350 gram sample of the masterbatch in 641 c.c. of each of the following solvents or solvent mixtures:

(A) methyl ethyl ketone (MEK)
(B) 2-nitropropane and ethanol (2:1 ratio by volume)
(C) tetrahydrofuran (THF)
(D) ethyl acetate and ethanol (2:1 ratio by volume)
(E) ethylene dichloride and n-propanol (2:1 ratio by volume)
(F) trichloroethylene and n-propanol (2:1 ratio by volume)
(G) 1,1-trichloroethane and isopropanol (2:1 ratio by volume)
(H) monochlorobenzene and n-butanol (2:1 ratio by volume)
(I) monochlorobenzene and n-butanol (1:1 ratio by volume)
(J) monochlorobenzene and n-butanol (5:1 ratio by volume)

The masterbatch sample was dissolved in the solvent or solvent mixture by resolving the 350 gram sample and solvent or solvent mixture in a container on revolving rolls until a smooth adhesive cement was obtained. In a few cases the mixture after being resolved as described had to be stirred with a propeller type stirrer to aid solution.

Each adhesive cement specimen was evaluated as follows: Two chromic acid cleaned pieces of 0.064″ x 4″ x 7″ 2024 ST3 ALCLAD aluminum sheets each were coated with a ¾″ wide strip of adhesive cement, adjacent a long side, by making a drawdown with a .012″ spreader bar; the drawdowns were dried at room temperature for 30 minutes, then at 158° F. for 15 minutes and then at 200° F. for 10 minutes. The parts of the sheets that were adhesive coated then were overlapped ½″ and cured for 60 minutes at 350° F. under 100 p.s.i. pressure. The bonded sheets were cut into 6 one inch wide test specimens.

A specimen was tested for lap shear strength as follows: First, the aforesaid one inch wide test specimen was clamped in the testing jaws of a Tinus-Olser tester, Model No. 60120, equipped with an oven that encompassed the testing jaws; next, the temperature of the oven was brought to the testing temperaure; specimens were tested both at (180° F. and 400° F.). When the adhesive layer of the specimen had reached the test temperature, as measured by the thermocouple attached to the bonded area, the specimens were pulled at a loading rate of 1200–1400 p.s.i. per minute to failure. The load at failure was calculated in pounds per square inch.

The observed test values in p.s.i. for the various adhesive cements are listed in Table 1. The adhesive cement using solvent A, MEK, as the solvent is identified in Table 1 as "Sample 1," the adhesive cement using solvent mixture B, 2-nitropropane and ethanol (2:1 ratio by volume) is identified as "Sample 2," the adhesive cement using solvent C, THF, as the solvent is identified as "Sample 3," etc.

TABLE I

| Sample | Aged, days | P.s.i. at 180° F. | P.s.i. at 400° F. | Aged, days | P.s.i. at 180° F. | P.s.i. at 400° F. |
|---|---|---|---|---|---|---|
| 1 | 16 | 2,200–2,190 | 545–560 | 69 | 1,540–1,685 | 272–370 |
| 2 | 10 | 2,405–2,590 | 575–525 | 60 | 1,250–1,130 | 178–262 |
| 3 | 5 | 2,405–2,565 | 1,315–1,270 | 50 | 2,365–2,505 | 1,320–1,189 |
| 4 | 10 | 2,800–2,700 | 1,065–1,035 | 60 | 2,560–2,300 | 1,050–1,024 |
| 5 | 17 | 2,605–2,570 | 1,210–1,215 | 69 | 2,490–2,500 | 832–876 |
| 6 | 17 | 2,250–2,250 | 800–765 | 70 | 2,085–2,065 | 766–776 |
| 7 | 9 | 1,815–1,750 | 875–775 | 62 | 1,795–1,565 | 696–684 |
| 8 | 17 | 2,985–2,935 | 1,165–1,120 | 69 | 2,760–2,720 | 1,060–1,010 |
| 9 | 15 | 2,835–2,760 | 1,390–1,310 | 68 | 2,190–2,170 | 83287þ4 |
| 10 | 16 | 2,790–2,750 | 1,170–1,075 | 68 | 2,800–2,800 | 1,228–1,–65 |

The test values listed in Table 1 show the deleterious effect of a ketone solvent (Sample 1) and a nitro solvent (Sample 2) upon the adhesive bond of aged cements, especially when tested at 400° F.

EXAMPLE II

A masterbatch was prepared by mixing the following ingredients on a roll mill:

Parts by weight
Butadiene - acrylonitrile copolymer (43% bound VCN) _____ 100
N-phenyl-2-naphthylamine _____ 1

A 99 gram sample of the masterbatch was dissolved with 227 grams of a resole ᶜ in 600 cc. of methyl ethyl ketone, and another 99 gram sample of the masterbatch was dissolved with 227 grams of the same resole in a solvent mixture consisting of 477 cc. of mono-chlorobenzene and 123 cc. of n-butanol.

Each adhesive cement was tested as described in Example I. The test values obtained are listed in Table 2. The adhesive cement using MEK as the solvent is identified as "Sample 11" and the adhesive cement using the mono-chlorobenzene and n-butanol mixture is identified as "Sample 12."

TABLE 2

| Sample | Aged, days | P.s.i. at 180° F. | P.s.i. at 400° F. | Aged, days | P.s.i. at 180° F. | P.s.i. at 400° F. |
|---|---|---|---|---|---|---|
| 11 | 0 | 965–950 | 665–650 | 51 | 660–695 | 390–394 |
| 12 | 0 | 1,100–1,050 | 615–645 | 51 | 635–620 | 356–352 |

This example illustrates that when a resolue type phenolic resin is used in place of a novolak type phenolic resin no improvement in lap shear tensile strength results when the special solvent systems germane to this invention are used. It will be noticed that after 51 days aging of the adhesives the 400° F. tensile strength are almost the same.

EXAMPLE III

The following adhesive cements were prepared and tested to show that a polyacrylate elastomer can be substituted for the butadiene-acrylonitrile copolymer of Example I. The following components were mixed on a rubber mill:

Grams
Ethyl acrylate-chlorovinyl ethyl ether copolymer (95 and 5 percent by weight respectively) _____ 70
Novolak resin ᵃ _____ 210

ᵃ The same two-stage phenol-formaldehyde resin that was used in Example I.

ᶜ A single stage phenol-formaldehyde liquid heat reactive resin dissolved in denatured ethyl alcohol (54–58 percent solution by weight) and having a specific gravity at 25° C. of 1.05 to 1.06.

Adhesive cements were prepared by dissolving equal weights of the above mixed components in 1 pint of methyl ethyl ketone (MEK) and in 1 pint of tetrahydrofuran (THF).

Each adhesive cement was evaluated for lap sheet testing as described in Example I. The test values obtained are listed in Table 3. The adhesive cement using MEK as the solvent is called "Sample 13" and the adhesive cement using THF as the solvent is called "Sample 14."

TABLE 3

| Sample | Aged, days | P.s.i. at 180° F. | P.s.i. at 400° F. |
|---|---|---|---|
| 13 | 11 | 1,110–970 | 283–236 |
| 14 | 11 | 850–1,095 | 710–792 |

The test values show that the use of THF as the solvent (Sample 14) results in an adhesive cement that has superior adhesive strength when tested at higher temperatures, i.e. 400° F. than is obtained from the adhesive cement using MEK as the solvent (Sample 13).

EXAMPLE IV

The following adhesive cements were prepared and tested in order to show that a linear polyesterurethane elastomer can be substituted for the butadiene-acrylonitrile copolymer of Example I. The following components were mixed on a rubber mill:

Grams
Polyurethane elastomer ᵈ _____ 92
Novolak resin ᵃ _____ 92

ᵃ The same two-stage phenol formaldehyde resin that was used in Example I.
ᵈ A linear polyesterurethane made by reacting 1.0 mol of polytetramethylene adipate having a molecular weight of about 1,000, 1.3 mols diphenyl methane-p,p'-diisocyanate and 0.3 mol of butanediol-1,4 using the method of preparation described in U.S. Pat. 2,871,218.

Adhesive cements were prepared by dissolving equal weights of the above mixed components in 1 pint of methyl ethyl ketone and in 1 pint of tetrahydrofuran.

Each adhesive cement was evaluated for lap shear strength as described in Example I. The test values obtained are listed in Table 4. The adhesive formulated with methyl ethyl ketone was identified as "Sample 15" and the adhesive in which tetrahydrofuran was used as the solvent was identified as "Sample 16."

TABLE 4

| Sample | Aged, days | P.s.i. at 180° F. |
|---|---|---|
| 15 | 11 | (*) |
| 16 | 11 | 278–384 |

*Tested samples fell apart upon testing.

We claim:
1. An adhesive cement consisting essentially of:
 (A) A bonding phase which is comprised essentially of:
  (1) a novolak resin, and
  (2) a linear polyesterurethane elastomer substantially free of crosslinked structures, and

(B) A solvent phase for dissolving said bonding phase which is comprised essentially of:
(1) a novolak resin solvent selected from the group consisting of alcohols having from 1 to 6 carbon atoms and five-membered heterocyclics, and
(2) a linear polyesterurethane solvent selected from the group consisting of tetrahydrofuran and dimethyl formamide, said bonding phase having from 40 to 200 parts by weight of novolak resin per 100 parts by weight of linear polyesterurethane elastomer, the linear polyesterurethane solvent being from 30 to 85 percent by volume of the total volume of solvent in said solvent phase, said cement containing from 5 to 50 percent by weight of solvent.

2. The adhesive cement of claim 1 wherein the novolak resin solvent is an alcohol.

References Cited

UNITED STATES PATENTS

| | | | |
|---|---|---|---|
| 2,255,229 | 9/1941 | Reppe et al. | 260—30.4 |
| 2,537,982 | 1/1951 | Finn | 260—845X |
| 2,684,350 | 7/1954 | Williams | 260—845X |
| 2,916,471 | 12/1959 | Rosahl et al. | 260—845 |
| 3,284,392 | 11/1966 | Steinfink | 260—841 |

FOREIGN PATENTS

| | | | |
|---|---|---|---|
| 518,494 | 11/1955 | Canada | 260—845 |
| 581,525 | 10/1946 | Great Britain | 260—841 |

MORRIS LIEBMAN, Primary Examiner

L. T. JACOBS, Assistant Examiner

U.S. Cl. X.R.

260—30.2, 33.4